United States Patent [19]

Suzuki et al.

[11] Patent Number: 5,487,007
[45] Date of Patent: Jan. 23, 1996

[54] CONTROL SYSTEM AND CONTROL METHOD FOR CONTROLLING POWER STEERING APPARATUS

[75] Inventors: Hidekazu Suzuki, Aichi; Mitsuhiko Harara; Tadao Tanaka, both of Okazaki, all of Japan

[73] Assignee: Mitsubishi Jidosha Kogyo Kabushiki Kaisha, Tokyo, Japan

[21] Appl. No.: 251,951

[22] Filed: Jun. 1, 1994

[30] Foreign Application Priority Data

Jun. 1, 1993 [JP] Japan ............................ 5-130363

[51] Int. Cl.⁶ .................................................. B62D 6/00
[52] U.S. Cl. ............................ 364/424.05; 180/143
[58] Field of Search ................ 364/424.05; 180/140, 180/141, 142, 143, 79.1

[56] References Cited

U.S. PATENT DOCUMENTS

| | | | |
|---|---|---|---|
| 4,541,499 | 9/1985 | Yanai et al. | 180/142 |
| 4,601,357 | 7/1986 | Miyoshi et al. | 180/140 |
| 4,691,797 | 9/1987 | Miller | 180/143 |
| 4,830,127 | 5/1989 | Ito et al. | 180/79.1 |
| 4,834,203 | 5/1989 | Takahashi et al. | 180/79.1 |
| 4,858,712 | 8/1989 | Neff | 180/143 |
| 4,909,343 | 3/1990 | Mouri et al. | 180/142 |
| 4,951,199 | 8/1990 | Whitehead | 364/424.05 |
| 5,067,576 | 11/1991 | Bober | 180/79.1 |
| 5,113,345 | 5/1992 | Mine et al. | 364/424.05 |
| 5,123,497 | 6/1992 | Yopp et al. | 180/142 |
| 5,229,955 | 7/1993 | Nishiwaki et al. | 364/550 |
| 5,261,503 | 11/1993 | Yasui | 180/142 |
| 5,265,019 | 11/1993 | Harara et al. | 364/424.05 |
| 5,276,620 | 1/1994 | Bottesch | 364/424.05 |
| 5,276,624 | 1/1994 | Ito et al. | 364/424.05 |
| 5,289,894 | 3/1994 | Yoshiyuki: Yasui | 180/141 |
| 5,388,658 | 2/1995 | Ando et al. | 180/197 |
| 5,392,214 | 2/1995 | Momose et al. | 364/424.05 |

FOREIGN PATENT DOCUMENTS

2-171384  7/1990  Japan.
2-171385  7/1990  Japan.

*Primary Examiner*—Kevin J. Teska
*Assistant Examiner*—Stephen J. Walder, Jr.

[57] ABSTRACT

In a control system for a power steering apparatus, in which a steering assist amount in a steering mechanism of a vehicle is controlled to a target assist amount, a vehicle speed sensor 41 for detecting a running speed V of the vehicle and a steering angle sensor 52 for detecting a steering angle ha of the vehicle are provided. A lateral acceleration calculation unit calculates a lateral acceleration $G_Y$ from the vehicle speed V and the steering angle ha and further determines the product $V \cdot G_Y$ of the vehicle speed V and the lateral acceleration $G_Y$. A fuzzy logic calculation unit then sets the target assist amount in accordance with a fuzzy logic rule using the vehicle speed V and the product $V \cdot G_Y$ as input conditions (membership functions). This thereby provides a control system and control method for controlling a power steering apparatus which presents an optimum steering characteristic in response to the running condition of the vehicle.

12 Claims, 11 Drawing Sheets

V·G$_Y$ (vehicle speed × lateral acceleration, Gkm/h)

FIG. 4

Assist amount (%)

CONTROL SYSTEM AND CONTROL METHOD FOR CONTROLLING POWER STEERING APPARATUS

BACKGROUND OF THE INVENTION

1. Field of the Invention

This invention relates to a control system and control method for controlling a power steering apparatus which controls a steering assist amount of a steering mechanism of a vehicle, for example, of a type wherein the target assist amount is set in accordance with a fuzzy logic rule.

2. Description of the Related Art

In recent years, power steering apparatuses have varied widely for assisting the force (hereinafter referred to as steering wheel operating force or steering force) for operating a steering wheel. Particularly, hydraulic power steering apparatus which make use of a hydraulic cylinder mechanism to hydraulically assist the steering wheel operating force are popularly employed as such power steering apparatuses. Also electrically operated power steering apparatuses, wherein the steering wheel operating force is assisted by an electric motor, have been developed.

Such power steering apparatuses as described above allow steering of a vehicle, for which high steering wheel operating force is normally required, such as, for example, in a large size vehicle or a vehicle which employs wide tires or wheels which must be steered, to be performed with a low steering wheel operating force, thereby eliminating the so-called heavy operation of the steering wheel. When the vehicle speed is low such as upon garaging, generally the steering operation is desired to be performed with a lower steering force. On the other hand, when the vehicle is running at a high speed, if the steering operation is very light (sensitive to a low amount of force), then running of the vehicle becomes unstable. Accordingly, in such situations, the steering operation is desired to be heavy (sensitive only to a high amount of force). Thus, a vehicle speed responsive power steering apparatus has been developed wherein the steering wheel operation is controlled in response to the speed of the vehicle. Thus, when the vehicle runs at a low speed, the steering assist amount is set to a comparatively high value so as to make the steering wheel operation lighter. Further, when the vehicle runs at a medium or high speed, the steering assist amount is set to a comparatively low value to make the steering wheel operation heavier.

In one such vehicle speed responsive power steering apparatus, a vehicle speed sensor is provided on the vehicle while a valve for adjusting hydraulic oil to be supplied to a power cylinder is provided in a hydraulic system of the hydraulic power steering apparatus. Operation of the valve is electronically controlled in response to a vehicle speed detected by the vehicle speed sensor to adjust the steering assist amount. The vehicle speed responsive power steering apparatus of the type just mentioned is called an electronically controlled power steering apparatus.

Figure 9:
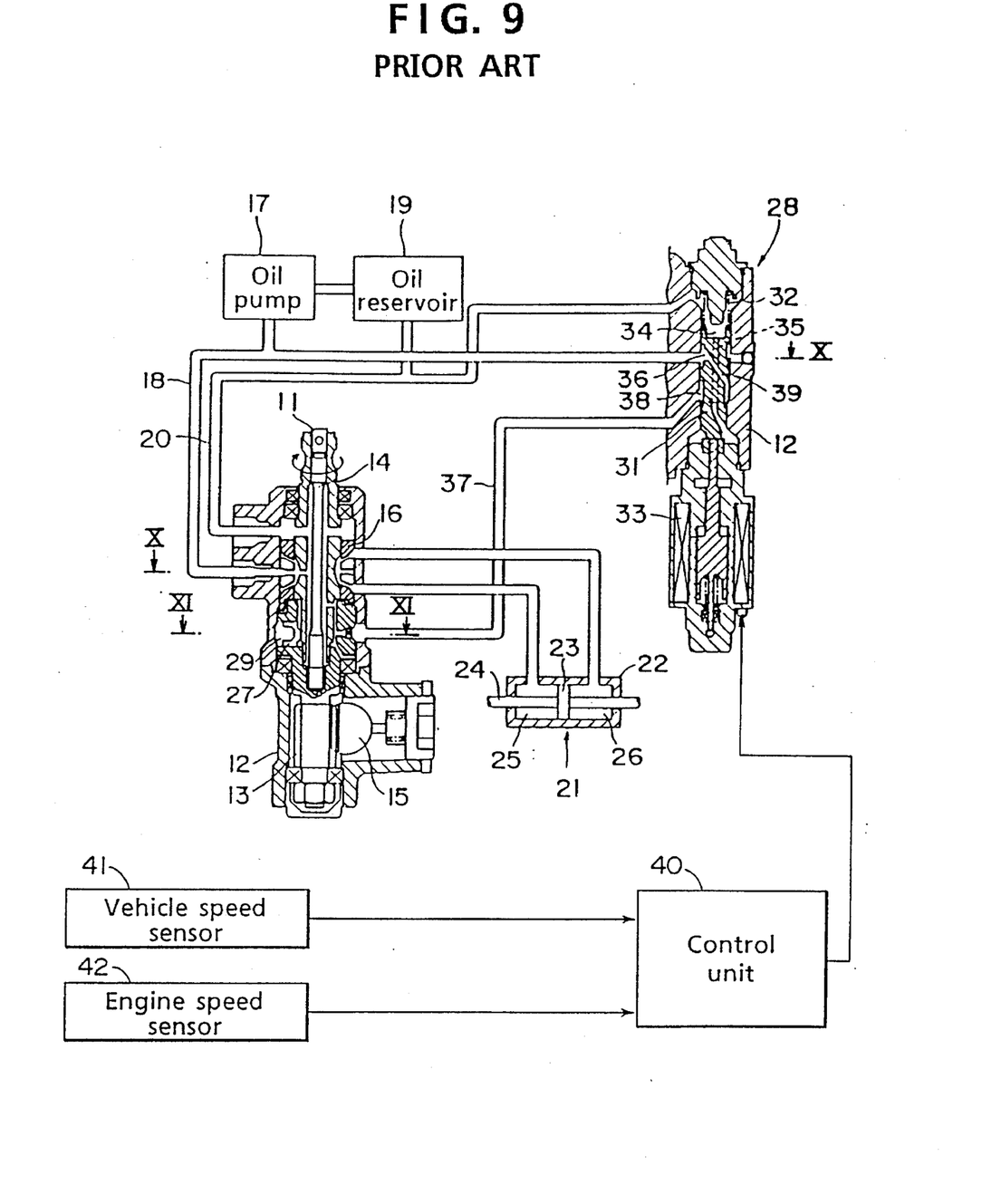
FIG. 9 is a schematic view showing structure of a hydraulic pressure control unit for power steering of a conventional electronically controlled power steering apparatus.
Figure 10:
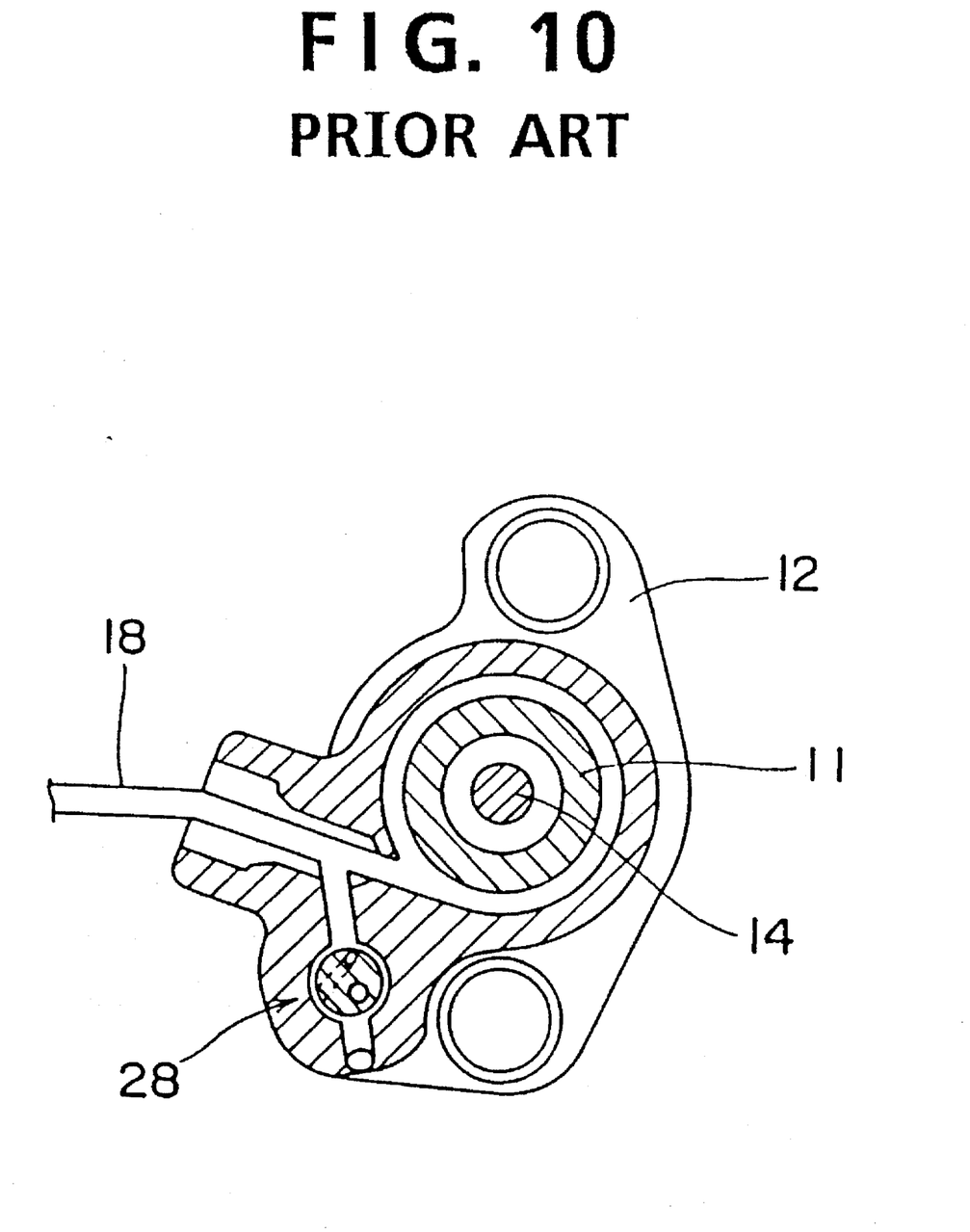
FIG. 10 is a schematic cross sectional view taken along line X—X in FIG. 9.

FIG. 9 is a schematic view showing construction of a hydraulic pressure control unit for a conventional electronically controlled power steering apparatus. FIG. 10 is a schematic cross sectional view taken along line X—X in FIG. 9. Finally, FIG. 11 is a schematic cross sectional view taken along line XI—XI in FIG. 9.

Figure 11:
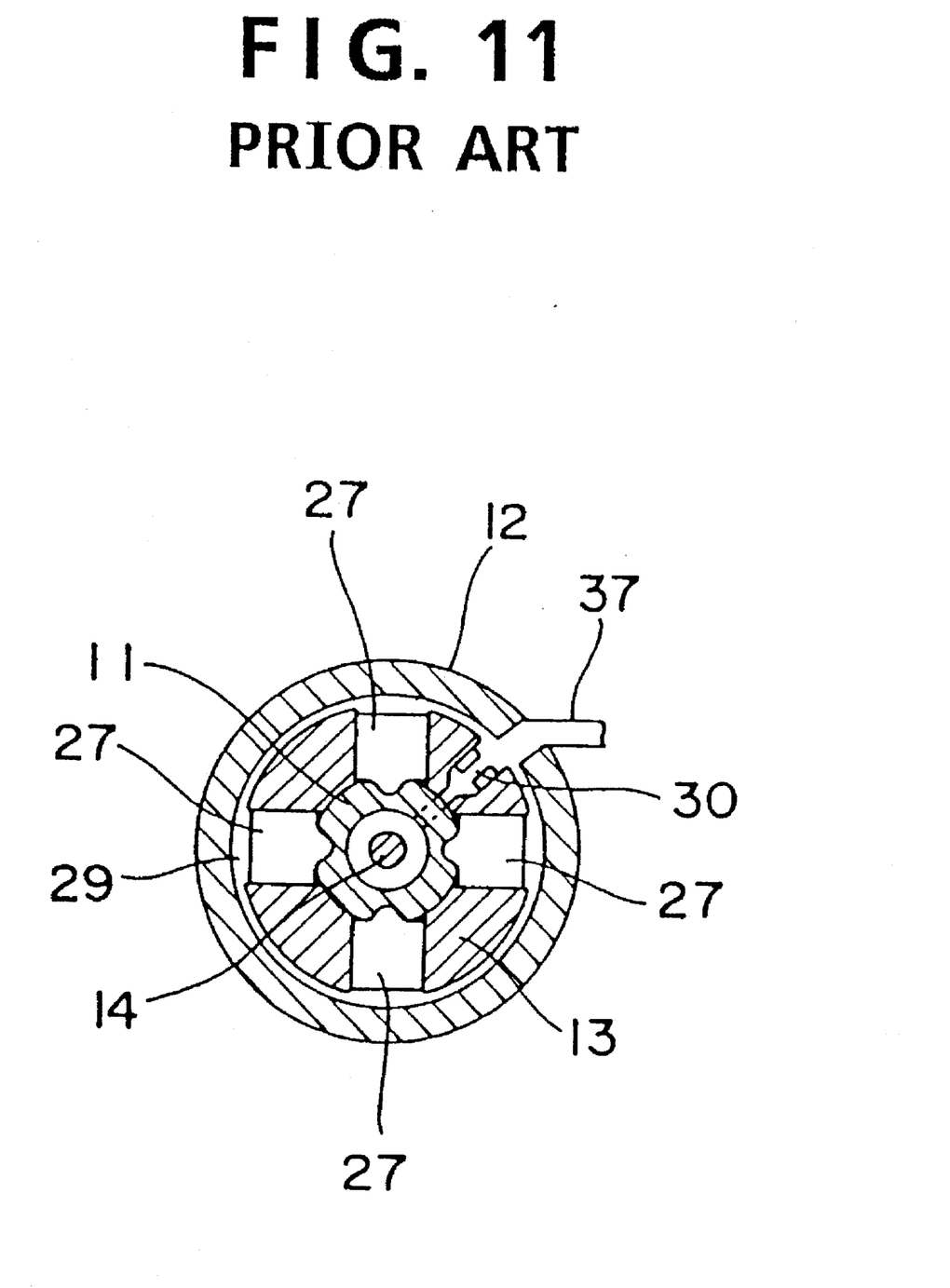
FIG. 11 is a schematic cross sectional view taken along line XI—XI in FIG. 9.

Referring to FIGS. 9 to 11, the numeral 11 indicates an input shaft for receiving steering force from the steering wheel (not shown), which is rotatably supported in a casing 12 by means of bearings. A pinion gear 13 is mounted for relative rotation aria lower end of the input shaft 11 with a bushing or the like (not shown) interposed therebetween. A torsion bar 14 is located in the hollow inside of the input shaft 11. The torsion bar 14 is coupled at an upper end thereof, for integral rotation to the input shaft 11, by way of a pin or the like. Further, it is not restrained at a lower end thereof by the input shaft 11.

The pinion gear 13, at the lower end of the input shaft 1, is held in serration coupling engagement with the lower end of the torsion bar 14 so that the steering force inputted to the input shaft 11 may be transmitted to the pinion gear 13 by way of the torsion bar 14. The pinion gear 13 is held in meshing engagement with a rack 15 so that the steering force of the input shaft 11 may be transmitted to the rack 15 by way of the pinion gear 13 to move the rack 15 in its axial direction (in a direction perpendicular to the plane of FIG. 9) to steer wheels of the vehicle (not shown).

In the casing 12, a rotary valve 16 is disposed between the input shaft 11 and the pinion gear 13. The rotary valve 16 is opened and closed in response to a difference in phase between the input shaft 11 and the pinion gear 13. The rotary valve 16 is connected with a hydraulic oil supply tube 18 of an externally provided oil pump 17 and a hydraulic oil discharge tube 20 of an oil reservoir 19. On the other hand, the numeral 21 indicates a power steering hydraulic cylinder, wherein a piston 23 is supported to be movable in an axial direction in a hollow cylinder 22 provided on a predetermined member on the vehicle body side. A piston shaft 24 of the piston 23 is mounted halfway on the rack 15. The piston 23 partitions the inside of the cylinder 22 into two parts to form right and left oil chambers 25 and 26.

Therefore, when steering force is inputted to the input shaft 11, the input shaft 11 is rigid and presents little distortion, but the torsion bar 14 transmits the steering force to the pinion gear 13 while presenting some distortion. Consequently, the pinion gear 13 presents a difference in phase with respect to the input shaft 11 towards the steering side, and the rotary valve 16 is driven according to the difference in phase. The rotary valve 16 is opened and closed so that hydraulic oil is supplied from the oil pump 17 through the hydraulic oil supply tube 18 to the right and left oil chambers 25 and 26 of the hydraulic cylinder 22 to provide the rack 15 with a steering assist force, producing required steering assist force in the steering direction.

Further in the casing 12, a plurality of reactive force plungers 27 for providing, upon steering, steering reactive force to increase the steering force (that is, steering reaction) are provided on an outer periphery of a lower portion of the input shaft 11 such that they surround the outer periphery of tile input shaft 11. The reactive force plungers 27 receive hydraulic oil supplied thereto under the control of a hydraulic pressure control valve 28 to restrain the input shaft 11 to provide steering reactive force in response to the hydraulic pressure.

Specifically, four reactive force plungers 27 are provided at equal intervals in the casing 12 so as to surround the outer periphery of the input shaft 11 and, at its outer end side, chambers 29 are formed and return orifices 30 are provided. On the other hand, the hydraulic pressure control valve 18 is provided in the casing 12 laterally adjacent and parallel to the input shaft 11. In the hydraulic pressure control value 28, a spool 31 is provided to be movable in a vertical direction in the casing 12, which is biased downward by a spring 32 provided at an upper part. A solenoid 33 is provided on an outer periphery of lower part of the spool 31 so that the solenoid 33 is energized to exert upward axial force to the spool 31.

The spool 31 has a pair of oil passages 34 and 35 communicated with the hydraulic oil discharge tube 20 of the oil reservoir 19, an annular oil passage 36 for communicating with the hydraulic oil supply tube 18 of the oil pump 17, and an annular oil passage 38 for communicating with the chamber 29 of the reactive force plunger 27 by way of a hydraulic supply/discharge tube 37, and an oil passage 39 for communicating the annular oil passages 36 and 38 with each other. Therefore, normally, when the solenoid 33 is unenergized, the spool 31 is at its downward position, and the hydraulic oil supply tube 18 and the annular oil passage 36 communicate with each other. As a result, hydraulic oil supplied to the hydraulic pressure control valve 28 through the hydraulic oil supply tube 18 is supplied to the chamber 29 of the reactive force plunger 27 from the annular oil passage 36 through the oil passage 39 and the annular oil passage 38. On the other hand, when the solenoid 33 is energized, the spool 31 is at its upward position, and the hydraulic oil supply tube 18 and the annular oil passage 36 do not communicate with each other. Therefore, hydraulic oil supplied from the oil pump 17 through the hydraulic oil supply tube 18 to the hydraulic pressure control valve 28 is not supplied to the chamber 29 of the reactive force plunger 27.

Thus, current applied to the solenoid 33 can be adjusted to control steering assist characteristics. Further, a control unit (CU) 40 for controlling the solenoid 33 is connected with a vehicle speed sensor 41, an engine speed sensor 42, and the like so that the control unit 40 sets the current applied to the solenoid 33 in response to output signals from these sensors to control the solenoid 33.

Upon steering, for example, while the vehicle stops or is running at a low speed, maximum current is supplied to the solenoid 33. Consequently, the spool 31 is moved upwardly to its highest position in which the annular oil passage 36 is not communicated with the oil pump 17 and supply of oil to the chambers 29 of the reactive force plungers 27 is stopped. Consequently, the reactive force plungers 27 do not restrain the input shaft 11, and steering can be performed with light-force.

On the other hand, for example, while the vehicle is running at a medium or high speed, the current supply to the solenoid 33 is decreased in response to an increase of the vehicle speed. Consequently, when the steering wheel is at its neutral position, the axial force of the spool 31 decreases as the current decreases. Further, as the axial force decreases, the spool 31 is moved down so that the annular oil passage 36 is communicated with the hydraulic oil supply tube 18 oil the oil pump 17 to allow oil to be supplied to the chambers 29 of the reactive force plungers 27. In this condition, the reactive force plungers 27 restrain the input shaft 11 to hold the steering wheel at its neutral position. Then, if the steering wheel is moved a little from the neutral position, then the output of the oil pump 17 attempts to rise. In this instance, the discharging pressure of the oil pump 17 acts upon the chambers 29 of the reactive force plungers 27 almost without being controlled by the hydraulic pressure control valve 28. Accordingly, in the vicinity of the neutral position of the steering wheel, the steering force is increased and a sufficient response of the steering wheel at the neutral position is obtained. This results in a feeling of stability of the steering wheel in the neutral position.

Upon steering while the vehicle is running at a medium or high speed, the output of the oil pump 17 rises, within an ordinary steering range, to increase the steering assist amount in response to steering of the steering wheel, that is, in response to an increase of the steering force. Meanwhile, the discharging pressure of the oil pump 17 acts upon the chambers 29 of the reactive force plungers 27 while being controlled by the hydraulic pressure control valve 28. Accordingly, the reactive force plungers act to restrain the input shaft 11 to increase the steering response (steering force).

As a result, upon steering when the vehicle runs at a medium or high speed, the steering force is increased by an amount corresponding to the action of the reactive force plungers 27 as compared with the steering force acting upon steering when the vehicle stops or is running at a low speed. In short, the steering response is increased and a stable steering feeling is obtained. Particularly, when the current supply to the solenoid 33 is decreased in response to an increase of the vehicle speed, the steering assist amount decreases and the steering force (steering response) increases, and consequently, a more stable steering feeling can be obtained.

The control unit 40 for controlling the solenoid 33 is connected with the vehicle speed sensor 41 and the engine speed sensor 42 so that when trouble with a detection circuit is detected from vehicle speed information, an engine speed signal or the like, the solenoid 33 is turned off to effect fail-safe control.

Another consideration is that the required steering force characteristics actually vary depending upon a running condition of the vehicle, that is, whether the vehicle is running straightforward or along a curve, or whether the vehicle is being accelerated or braked. However, conventional electronically controlled power steering apparatuses have not been successful in always providing an optimum steering feeling since they merely control the steering force in response to the speed of the vehicle as described above.

For example, when the vehicle advances to a corner, the steering force characteristic is desired to present a somewhat heavy steering force so that the driver can grasp the running condition of the vehicle at that time from an appropriate variation of the steering force. In particular, when the vehicle advances to a corner while being accelerated, the steering force characteristic is desired to present a somewhat heavy steering force so that the driver can grasp the running condition of the vehicle appropriately at that time. However, with the conventional electronically controlled power steering apparatus, since the vehicle speed increases as a result of acceleration, although the steering assist amount of the steering wheel is decreased presenting a small amount of heavy driving force, a sufficiently heavy driving force cannot be provided in most cases.

On the other hand, when the vehicle advances to a corner while being decelerated, the steering force characteristic is desired to present a rather heavy steering force so that the driver can grasp the running condition of the vehicle appropriately. However, with the conventional electronically controlled power steering apparatus, the steering force characteristic becomes lighter by an amount corresponding to the deceleration. Further, when the vehicle advances to a corner at a fixed speed, the steering force characteristic is desired to present a little heavier ("a little heavier" here represents heavier than "rather heavy") steering force so that the driver can grasp the running condition of the vehicle appropriately. With the conventional electronically controlled power steering apparatus, however, the steering force characteristic does not present any variation at that time.

In addition to the electronically controlled power steering apparatus described above, several power steering apparatuses have been proposed including a power steering apparatus disclosed in Japanese Patent Laid-open Publication 2-171384 wherein the steering assist amount is varied in accordance with a fuzzy logic rule from a steering direction signal of the steering wheel and a height signal of the vehicle. Another power steering apparatus is disclosed in Japanese Patent Laid-open Publication 2-171385 wherein the steering assist amount is varied in accordance with a fuzzy logic rule from a steering direction signal of the steering wheel and a temperature signal of the vehicle.

However, also those power steering apparatuses fail to control the steering assist amount for the steering wheel so as to provide an optimum steering characteristic in response to a running condition of the vehicle and particularly do not always provide an optimum steering feeling, as described above, when the vehicle advances to a corner from straightforward running.

Further, the applicant has already applied for a patent on a fuzzy logic control type electronically controlled power steering apparatus which solves the above problems as Japanese Patent Application 4-253173 (filed in the U.S. on Sep. 22, 1992: co-pending Appl. Ser. No. 08/124,700).

This fuzzy logic control type electronically controlled power steering apparatus (Japanese Patent Application 4-253173) has a target assist amount setting device for setting a target assist amount during electronic control, which sets the target assist amount in accordance with a fuzzy logic rule from the running speed and the lateral acceleration of the vehicle as input conditions. Specifically, the target assist amount setting device uses a membership function for evaluating the running speed of the vehicle and a membership function for evaluating the lateral acceleration generated in the vehicle to set the target assist amount in accordance with a fuzzy logic rule wherein the target assist amount is decreased as the running speed of the vehicle increases and the target assist amount is decreased as the lateral acceleration increases.

However, this fuzzy logic control type electronically controlled power steering apparatus fails to obtain a sufficient stability of steering when the vehicle runs at a high speed. That is, the steering force is required to be set heavier (small assist amount) to obtain stability of steering in high-speed running as compared to medium-speed running of the vehicle. However, this power steering apparatus increases and decreases the target assist amount according to variations in the running speed of the vehicle. Therefore, when the steering angle decreases and the lateral acceleration decreases during high-speed running of the vehicle, the target assist amount setting device increases the target assist amount in response to a decrease in lateral acceleration generated in the vehicle, resulting in unstable steering feeling during high-speed running of the vehicle. In the power steering apparatus, the rule of the lateral acceleration can be changed in accordance with the vehicle speed range (high-speed - low-speed) to obtain a sufficient steering feeling during high-speed running of the vehicle. However, this increases the number of membership functions and fuzzy logic rules, resulting in complex control.

It is a primary object of the present invention to provide a control system and control method for controlling a power steering apparatus by which an optimum steering characteristic can be obtained in response to a running condition of the vehicle, thereby eliminating the problems described above.

SUMMARY OF THE INVENTION

In accordance with the present invention which attains the above object, there is provided a control system for a power steering apparatus which controls a steering assist amount of a steering mechanism of a vehicle, comprising vehicle speed detection means for detecting a vehicle speed, lateral acceleration detection means for determining (detecting or estimating) a lateral acceleration applied to the vehicle, and a controller for setting the target steering assist amount using the product of the vehicle speed and the lateral acceleration as input factors so that the target steering assist amount is decreased as the product increases.

Therefore, the vehicle speed detection means detects the running speed of the vehicle, the lateral acceleration detection means detects or estimates the lateral acceleration of the vehicle, and the controller sets the target assist amount using the product of the vehicle speed and the lateral acceleration of the vehicle as an input factor. Thus, an optimum steering characteristic according to the running and turning condition of the vehicle is obtained. By setting the target steering assist amount to a smaller value as the product increases, since the steering force can be set heavier when the vehicle runs at a high speed or rapidly turns, the steering force can be appropriately set heavier on a winding road where the vehicle has some speed and lateral acceleration. Further, the control can be simplified by the use of the product.

Further, in the control system for controlling a power steering apparatus of the present invention, the controller sets the target assist amount to a fixed value independent of a change in the product in an area where the product is not less than a predetermined value. This thereby achieves even more improved stability of steering operation in a high speed running condition of the vehicle. Therefore, the steering characteristics can be appropriately controlled over a wide range of operating conditions, while preventing the steering force from becoming excessively heavy when the vehicle rapidly turns.

In another aspect of the control system for controlling a power steering apparatus of the present invention, the controller sets the target assist amount using the vehicle speed and the product as input variables in accordance with a fuzzy logic rule, thereby enabling fine control with a reduced number of rules.

In a further aspect of the control method for controlling a power steering apparatus of the present invention, the controller sets the target assist amount in accordance with a fuzzy logic rule using a membership function for evaluation of the running speed of the vehicle and another membership function for evaluation of the product of the running speed of the vehicle and the lateral acceleration of the vehicle so that the target assist amount is decreased in response to an increase in the running speed of the vehicle and is decreased in response to an increase in the product of the running speed and the lateral acceleration. Therefore, since the steering assist amount is decreased as the vehicle speed and the product increase, the steering characteristic becomes heavier as the vehicle speed increases to obtain stable steering feeling. Further, the steering characteristic becomes heavier as turning becomes more rapid so that a steering feeling according to the turning degree is obtained and the driver can grasp the turning condition. Therefore, the steering characteristics in response to the vehicle speed can be further appropriately corrected in accordance with the product.

In the control system for controlling a power steering apparatus of the present invention, the lateral acceleration detection means calculates the lateral acceleration from detection results of the vehicle speed sensor and the steering angle sensor provided on the vehicle, thereby reducing the need for any addition of parts for a vehicle which already includes a vehicle speed detection sensor and a steering angle detection sensor for some other control.

Alternatively, the lateral acceleration detection means may be a lateral acceleration sensor which directly detects the lateral acceleration applied to the vehicle.

There is further provided, according to the present invention, a control method for controlling a power steering apparatus for controlling a steering assist amount in a steering mechanism of a vehicle to a target assist amount, using the product of the detected vehicle speed and the detected or estimated lateral acceleration applied to the vehicle as an input factor so that the target assist amount is decreased in response to an increase in the product of the running speed and the lateral acceleration.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

An electronically controlled power steering apparatus as an embodiment of the present invention will be described in detail with reference to the drawings.

The electronically controlled power steering apparatus of the present embodiment is used to control the hydraulic pressure control unit for power steering in accordance with the fuzzy logic rule which has a mechanical section (hardware construction) substantially similar to that of the conventional electronically controlled power steering apparatus described hereinabove, and accordingly, the mechanical section will be described briefly below.

Figure 1:
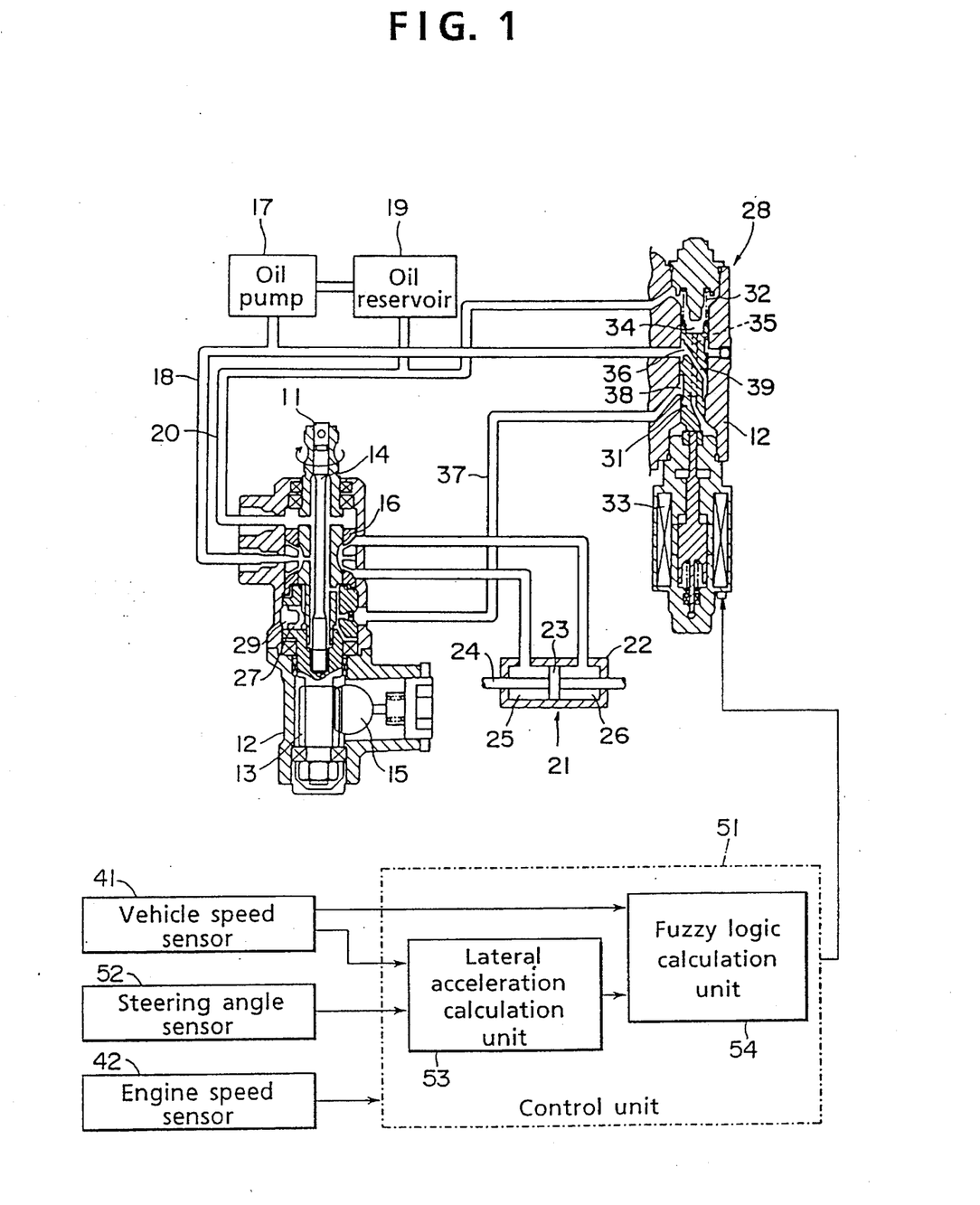
FIG. 1 is a schematic view showing structure of a hydraulic pressure control unit for the control system for power steering of an embodiment of the electronically controlled power steering apparatus according to the present invention.

Referring to FIG. 1, an input shaft 11 is to receive steering force from a steering wheel (not shown), and is rotatably supported in a casing 12. The input shaft is rotatably provided at its lower end with a pinion gear 13, and with a torsion bar 14 in its hollow portion, of which only an upper end is coupled with the input shaft 11. The pinion gear 13 is in serration coupling engagement with a lower end of the torsion bar 14, and the pinion gear 13 engages with a rack 15, whereby steering force of the input shaft 11 is transmitted to the pinion gear 13 through the torsion bar 14, and then to the rack 15 so that the rack 15 is moved in an axial direction to steer the wheels of the vehicle.

A rotary valve 16 in the casing 12 is opened and closed according to a difference in phase in a peripheral direction between the input shaft 11 and the pinion gear 13, and is connected with a hydraulic oil supply tube 18 of an oil pump 17 and a hydraulic oil discharge tube 20 of an oil reservoir 19. On the other hand, a power steering hydraulic cylinder 21 comprises a piston 29 supported in the cylinder 22 to be movable in an axial direction, and a piston shaft 24 of the piston 29 is mounted halfway to the rack 15. The piston 23 partitions the cylinder 22 into right and left oil chambers 25 and 26.

Therefore, when steering force is inputted to the input shaft 11, the torsion bar 14 transmits the steering force to the pinion gear 13 while presenting some distortion. Consequently, the pinion gear 13 presents a difference in phase with respect to the input shaft 11 towards the steering side, and the rotary valve 16 is driven according to the difference in phase. The rotary valve 16 is opened and closed so that hydraulic oil is supplied from the oil pump 17 to the individual oil chambers 25 and 26 of the hydraulic cylinder 22 to provide the rack 15 with a steering assist force, producing a required steering assist force in the steering direction.

Reactive force plungers 27 for exerting, upon steering, steering reactive force to increase the steering force (that is, steering response) are provided on an outer periphery of a lower portion of the input shaft 11. The reactive force plungers 27 restrain the input shaft 11 under the control of a hydraulic pressure control valve 28. That is, the present embodiment has four units of the reactive force plungers 27 at equal intervals in the casing 12 so as to surround the outer periphery of the input shaft 11 and, at its outer end side, chambers 29 are formed. On the other hand, the hydraulic pressure control valve 28 is provided in the casing 12 laterally adjacent and parallel to the input shaft 11. In the hydraulic pressure control value 28, a spool 31 is provided to be movable in a vertical direction in the casing 12, which is biased downward by a spring 32 provided at an upper part. A solenoid 33 is provided on an outer periphery of lower part of the spool 31 so that the solenoid 33 is energized to exert upward axial force to the spool 31.

The spool 31 has a pair of oil passages 34 and 35 communicated with the hydraulic oil discharge tube 20 of the oil reservoir 19, an annular oil passage 36 for communicating with the hydraulic oil supply tube 18 of the oil pump 17, an annular oil passage 38 for communicating with the chamber 29 of the reactive force plunger 27 by way of a hydraulic supply/discharge tube 37, and an oil passage 39 for communicating the annular oil passages 36 and 38 with each other. Therefore, normally, when the solenoid 33 is unenergized, the spool 31 is at its downward position, and the hydraulic oil supply tube 18 and the annular oil passage 36 communicate with each other. As a result, hydraulic oil is supplied from the oil pump 17 to the hydraulic pressure control valve 28 through the hydraulic oil supply tube 18, and to the chamber 29 of the reactive force plunger 27 from the annular oil passage 36 through the oil passage 39 and the annular oil passage 38. On the other hand, when the solenoid 33 is energized, the spool 31 is at its upward position, and the hydraulic oil supply tube 18 and the annular oil passage 36 do not communicate with each other. Therefore, hydraulic oil is not supplied to the hydraulic pressure control valve 28.

The hydraulic pressure control valve 28 is controlled by a control unit (CU) 51. That is, the control unit 51 is connected with a vehicle speed sensor 41, a steering angle sensor 52, an engine speed sensor 42, and the like. The control unit 51 has a lateral acceleration calculation unit 53 and a fuzzy logic calculation unit 54 for setting the target steering assist amount by way of fuzzy logic calculation. In the control unit 51, the lateral acceleration calculation unit 53 calculates a lateral acceleration G$_Y$ generated on the vehicle from a vehicle speed V inputted from the vehicle speed sensor 41 and a steering angle ha inputted from the steering angle sensor 52. Further, the lateral acceleration calculation unit 53 multiplies the vehicle speed V by the calculated lateral acceleration G$_Y$ to obtain a product V.G$_Y$, which is outputted to the fuzzy logic calculation unit 54. The fuzzy logic calculation unit 54 performs fuzzy logic calculation from the vehicle speed V inputted from the vehicle speed sensor 41 and the calculated value V.G$_Y$ inputted from the lateral acceleration calculation unit 53, and outputs the calculation result to the hydraulic pressure control valve 28 so that the current applied to the solenoid 33 is set to control the solenoid 33.

Figure 2:
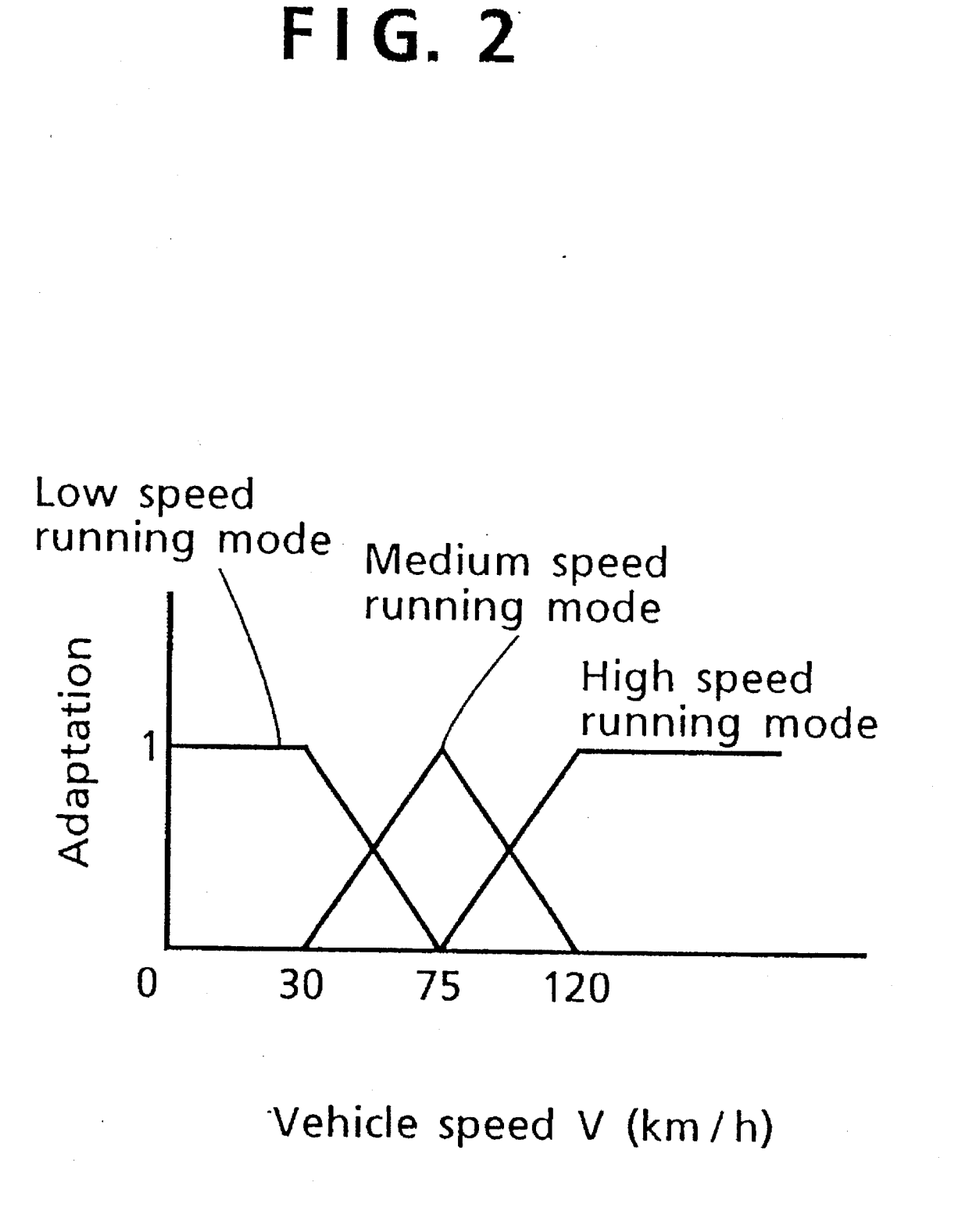
FIG. 2 is a graph showing a membership function for vehicle speed used for fuzzy logic control.
Figure 3:
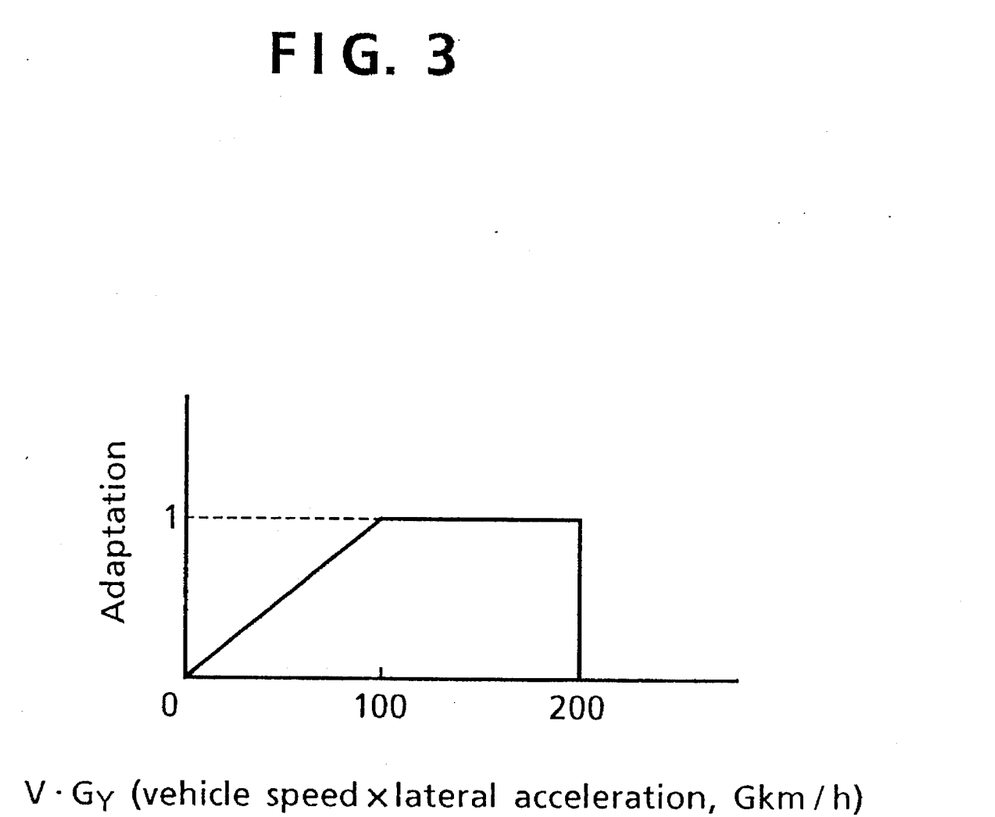
FIG. 3 is a graph showing a membership function for vehicle speed×lateral acceleration used for fuzzy logic control.
Figure 4:
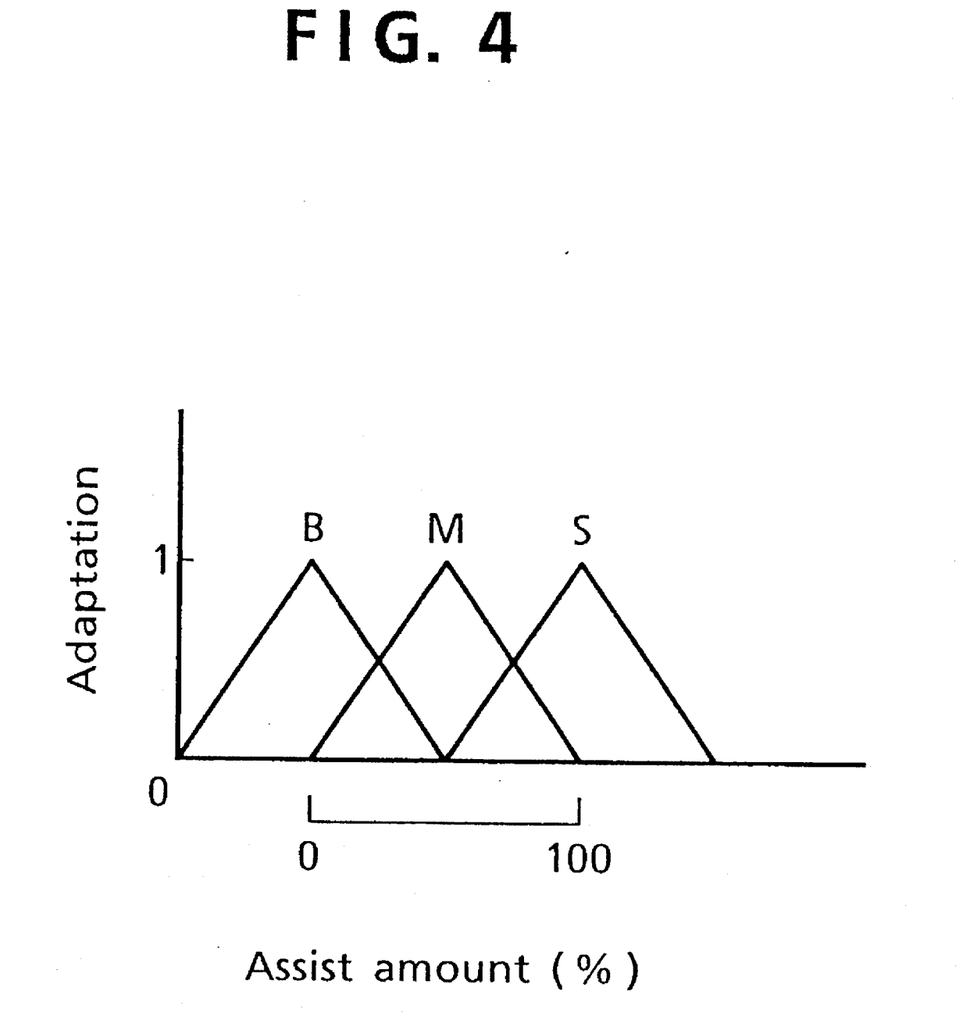
FIG. 4 is a graph showing calculation for obtaining a power steering assist amount from an adaptation of the individual membership functions by an elastic center method.

In the fuzzy logic calculation unit 54, as shown in FIG. 2, a membership function for obtaining an adaptation (grade) of the running condition from the vehicle speed V and, as shown in FIG. 3, a membership function for obtaining an adaptation of the calculated value V.G$_Y$ as the product of the vehicle speed V and the lateral acceleration G$_Y$ are applied to obtain an adaption of the vehicle speed V and an adaptation of the calculated value V.G$_Y$ of the running condition of the vehicle. From these adaptations, as shown in FIG. 4, a control amount, that is, a steering assist amount, is determined using the method of elastic center from the graph showing a trapezoidal set to control the amount of current to be applied to the solenoid 33.

In the present embodiment, as running conditions, three modes are set including a low speed running mode for the vehicle speed V of 0 to 75 km/h, a medium speed running mode for 30 to 120 km/h, and a high speed running mode for more than 75 km/h, and an adaptation for each of those modes is determined in response to the vehicle speed V. On the other hand, as shown in FIG. 4, evaluation of the assist control amount is divided into three stages of S (small), M (medium), and B (big), so that the assist amount is set to 100% in the evaluation S, and the assist amount is set to 0% in the evaluation B.

Then, the steering modes and the assist amounts are made to correspond to each other such that the low speed running mode corresponds to the evaluation S of the assist amount, the medium speed running mode to the evaluation M, and the high speed running mode to the evaluation B. That is, a rule is applied such that when the vehicle speed V increases, the steering assist amount is decreased to make steering heavier.

Further, as shown in FIG. 3, the membership function regarding the product V.G$_Y$ of the vehicle speed V and the lateral acceleration G$_Y$ is set such that the adaptation is linearly increased in response to an increase in the calculated value V.G$_Y$ up to a region where the calculated value V.G$_Y$ is 0 to 100 G km/h, and the adaptation is fixed independent of the calculated value V.G$_Y$ in a region where the calculated value V.G$_Y$ is more than 100 G km/h. The membership function regarding the calculated value V.G$_Y$ is made to correspond to the evaluation B of assist amount according to the adaptation. That is, when the calculated value V.G$_Y$ increases, the steering assist amount is decreased to make steering heavier.

As described above, the target assist amount can be obtained by the elastic center method using the graph for calculation processing shown in FIG. 4 from the thus determined adaptation of the vehicle speed V and the adaptation of the calculated value V.G$_Y$.

Here, in the present embodiment of the electronically controlled power steering apparatus described above, control procedure by the control unit 51 will be described with reference to the flow chart in FIG. 5.

Figure 5:
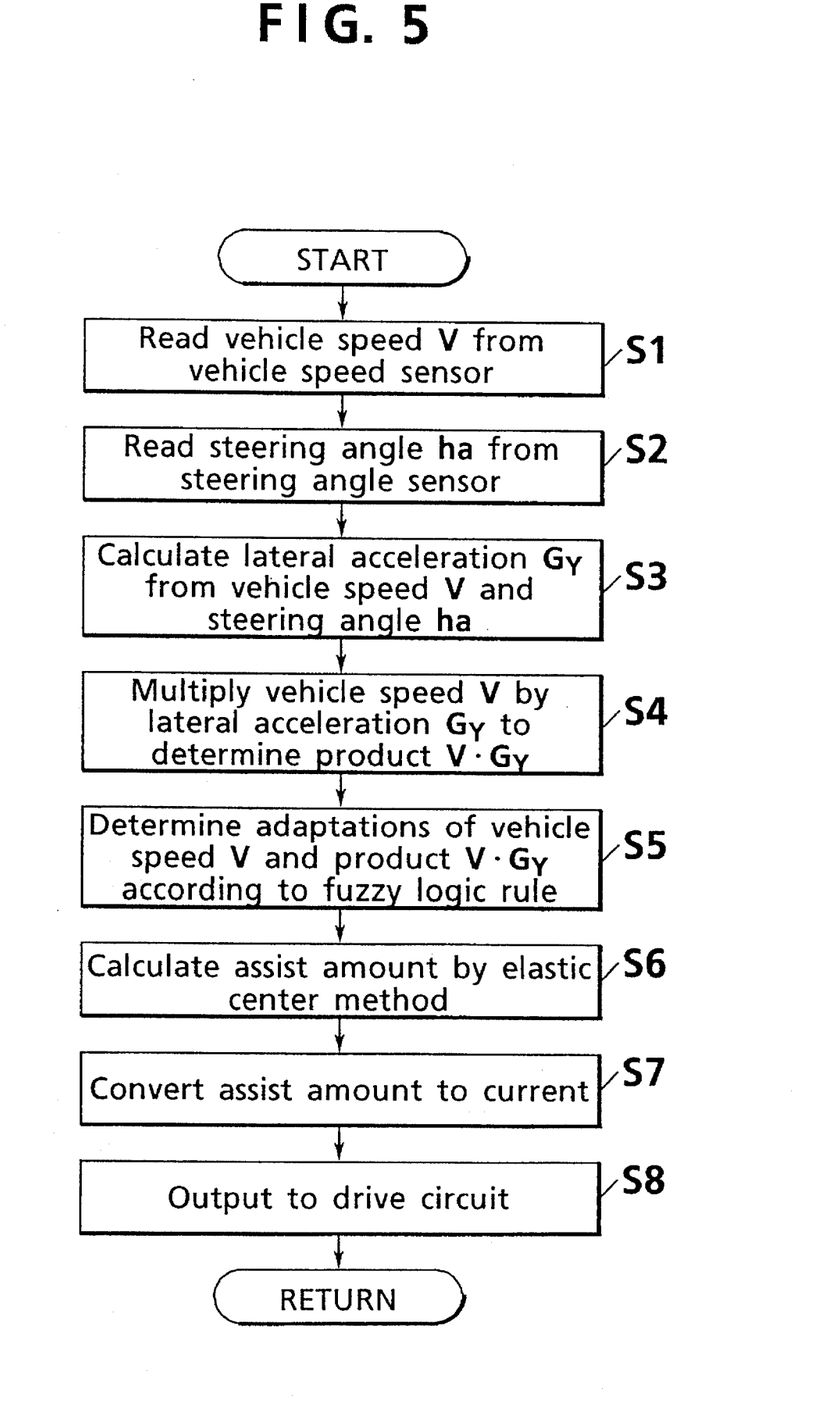
FIG. 5 is a flow chart showing fuzzy logic control.

Referring to FIG. 5, first in step S1, the vehicle speed sensor 41 detects the running speed V of the vehicle, outputs a vehicle speed signal to the CU 51 (the lateral acceleration calculation unit 53 and the fuzzy logic calculation unit 54), and the processing proceeds to step S2. In step S2, the steering angle sensor 52 detects the steering angle of the vehicle, outputs a steering angle signal to the CU 51 (lateral acceleration calculation unit 53), and the processing proceeds to step S3. In step S3, the CU 51 converts analog signals of the sensor signals of the vehicle speed V and the steering angle ha to digital signals, and the lateral acceleration calculation unit 53 calculates the lateral acceleration G$_Y$ generated on the vehicle according to the vehicle speed V and the steering angle ha. Further, in step S4, the vehicle speed V is multiplied by the lateral acceleration G$_Y$ to obtain the product V.G$_Y$.

In step S5, the fuzzy logic calculation unit 54 determines an adaptation regarding running condition of vehicle speed V from the graph of membership shown in FIG. 2, and also determines an adaptation regarding running condition of the product V.G$_Y$ from the graph of membership shown in FIG. 3. In step S6, a target assist amount is determined by the elastic center method using the graph of processing shown in FIG. 4. Further, in step 37, the target assist amount is converted to the corresponding current to be applied to the solenoid 33 of the hydraulic pressure control valve 28 and, in step S8, this current for controlling the steering assist amount is outputted to a drive circuit, that is, the solenoid 33 of the hydraulic control valve 28.

Here, fuzzy logic control in an actual running condition of the vehicle will be described with reference to calculation for determining the assist amount by the elastic center method shown in FIG. 6 and FIG. 7. For example, suppose a condition where the vehicle begins turning at a vehicle speed V of 60 km/h from straightforward running at a vehicle speed V of 75 km/h. This condition corresponding to a condition where the vehicle advances to a corner while decelerating in the medium speed running mode. In this case, the lateral acceleration G$_Y$ when the vehicle is straightforward running at a vehicle speed V of 75 km/h is 0 G, and the lateral acceleration GY when the vehicle is turning at a vehicle speed V of 60 km/h is about 0.55 G.

Figure 6:
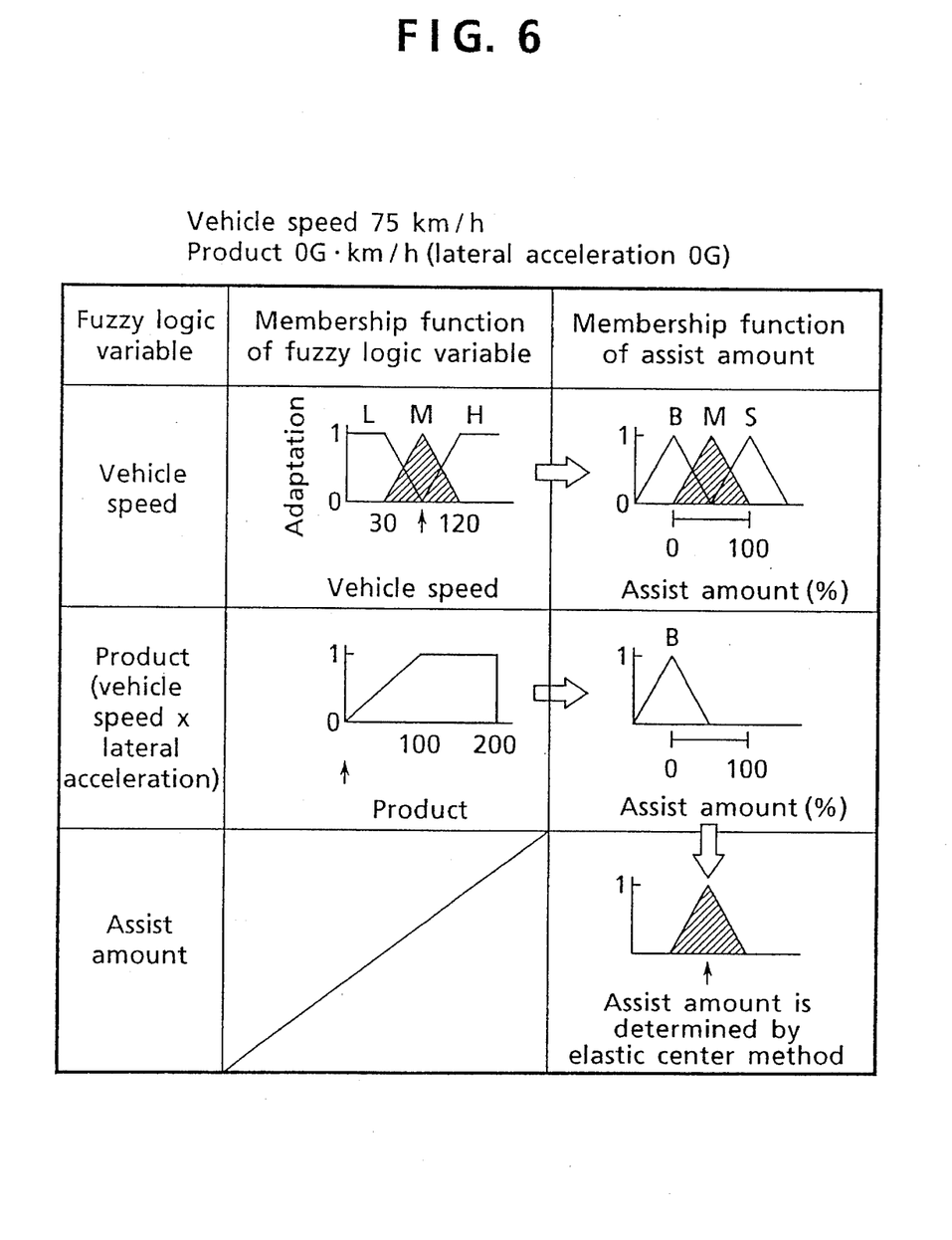
FIG. 6 is a schematic illustration showing a practical control example of calculation for obtaining the assist amount by an elastic center method from the individual membership functions for vehicle speed and vehicle speed× lateral acceleration.
Figure 7:
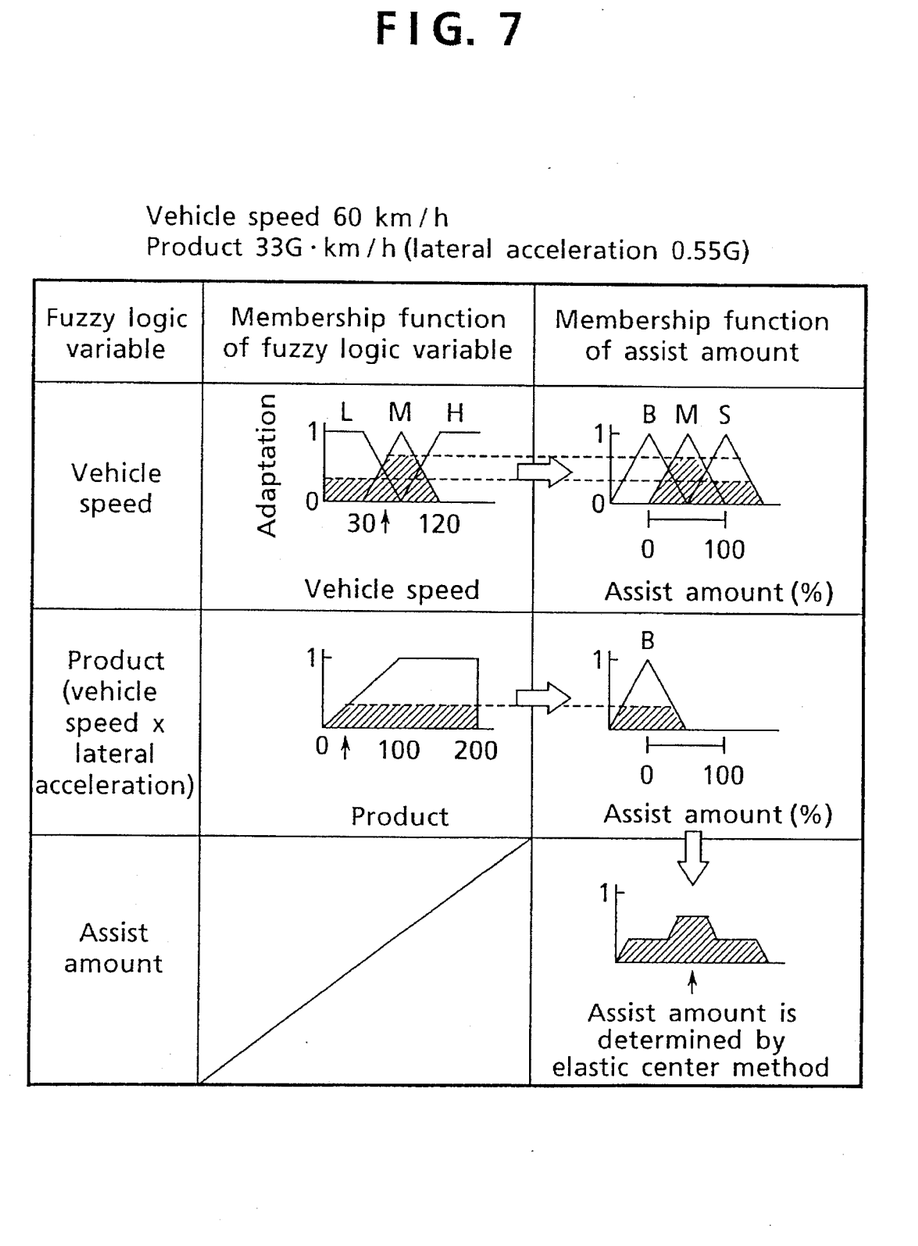
FIG. 7 is a schematic illustration showing a practical control example of calculation for obtaining the assist amount by an elastic center method from the individual membership functions for vehicle speed and vehicle speed× lateral acceleration.

Therefore, as shown in FIG. 6, when the vehicle speed V is 75 km/h, the adaptation in the medium speed running mode is 1, and evaluation of the assist control amount corresponding to the medium speed running mode is M. Further, since the lateral acceleration GY at that time is 0 G, the product V.GY is also 0 G km/h, and the adaptation is 0. On the other hand, as shown in FIG. 7, when the vehicle speed V is 60 km/h, the adaptation in the medium speed running mode is 0.67, and the adaptation in the low speed running mode is 0.33, evaluation of the assist control amount corresponding to medium speed running is M, and evaluation of the assist control amount corresponding to low speed running is S. Further, the lateral acceleration GY at that time is 0.55 G, the product V.GY of the vehicle speed V (60 km/h) and the lateral acceleration GY (0.55 G) is 33 G km/h, and the adaptation is 0.33.

From the adaptations regarding the thus obtained vehicle speed V and the product V.GY, the elastic center method is used. That is, the elastic center position of the total area corresponding to the adaptation is determined to obtain the target assist amount. In a straightforward running condition at a vehicle speed V of 75 km/h, as shown in FIG. 6, evaluation of the assist control amount regarding to the vehicle speed V is M, and its adaption is 1, whereas the value is 0 regarding to the product V.GY. Therefore, the assist amount is 50%. On the other hand, in turning condition at a vehicle speed V of 60 km/h, as shown in FIG. 7, evaluation of the assist control amount regarding the vehicle V is m, and its adaptation is 0.67, and the adaptation is 0.33 in evaluation S, evaluation of the assist control amount regarding the product V.GY is 0.33. Therefore, the assist amount is 50%.

As described above, when the vehicle begins turning at a vehicle speed V=60 km/h from a straightforward running condition at a vehicle speed V=75 km/h, since the vehicle speed V decreases but the lateral acceleration GY increases, the steering assist amount of power steering is unchanged from 50%. That is, when the vehicle is decelerating, since the vehicle speed V is decreased, in general the steering assist amount increases to make steering lighter. However, in this case, since the vehicle advances to a corner, the lateral acceleration GY is applied, and steering of the steering wheel may become difficult. Therefore, in the present embodiment, the lateral acceleration GY applied to the vehicle is applied as a membership function in response to a change in the lateral acceleration GY so as to decrease the steering assist amount of power steering and make the steering wheel slightly heavier than usual.

When the vehicle advances to a corner while being accelerated, since the vehicle speed V increases and the lateral acceleration GY increases due to the acceleration, the steering assist amount of the power steering is additionally decreased, and the steering becomes heavier.

As described above, since, in the electronically controlled power steering apparatus of the present embodiment, in addition to a change in the vehicle speed V, the product V.GY of the vehicle speed V and the lateral acceleration GY is applied as a membership function to control the steering assist amount in response to the membership function in accordance with the fuzzy logic rule, when the vehicle advances to a corner, the lateral acceleration GY (steering angle) increases to decrease the assist amount, and the steering wheel becomes heavier to such an extent. Therefore, even though the vehicle speed condition is different, when the vehicle advances to the corner, the driver can operate the steering wheel while actually feeling the advance to the corner. Further, the membership function retarding the lateral acceleration GY is provided with a steering linearity area where the adaptation varies linearly against the lateral acceleration GY, steering linearity is maintained.

Since the electronically controlled power steering apparatus of the present embodiment applies the product V.GY of the vehicle speed V and the lateral acceleration GY as a membership functions for controlling the steering assist amount, even though the steering angle is decreased to decrease the lateral acceleration GY in high speed running of the vehicle, the vehicle speed V is sufficiently high. Thus, the product V.GY does not considerably decrease, the target assist amount does not considerably increase, and the steering wheel does not become that much heavier. Therefore, steering feeling in high speed running of the vehicle is sufficiently maintained, achieving improved steering stability.

Further, since, in the electronically controlled power steering apparatus of the present embodiment, the steering assist amount is controlled in accordance with two fuzzy logic rules, that is, a fuzzy logic rule where the steering assist amount is decreased to make steering heavier as the vehicle speed V increases, and a fuzzy logic rule where the steering assist amount is decreased to make steering heavier as the product V.GY increases, finer control is possible with a reduced number of rules.

Figure 8:
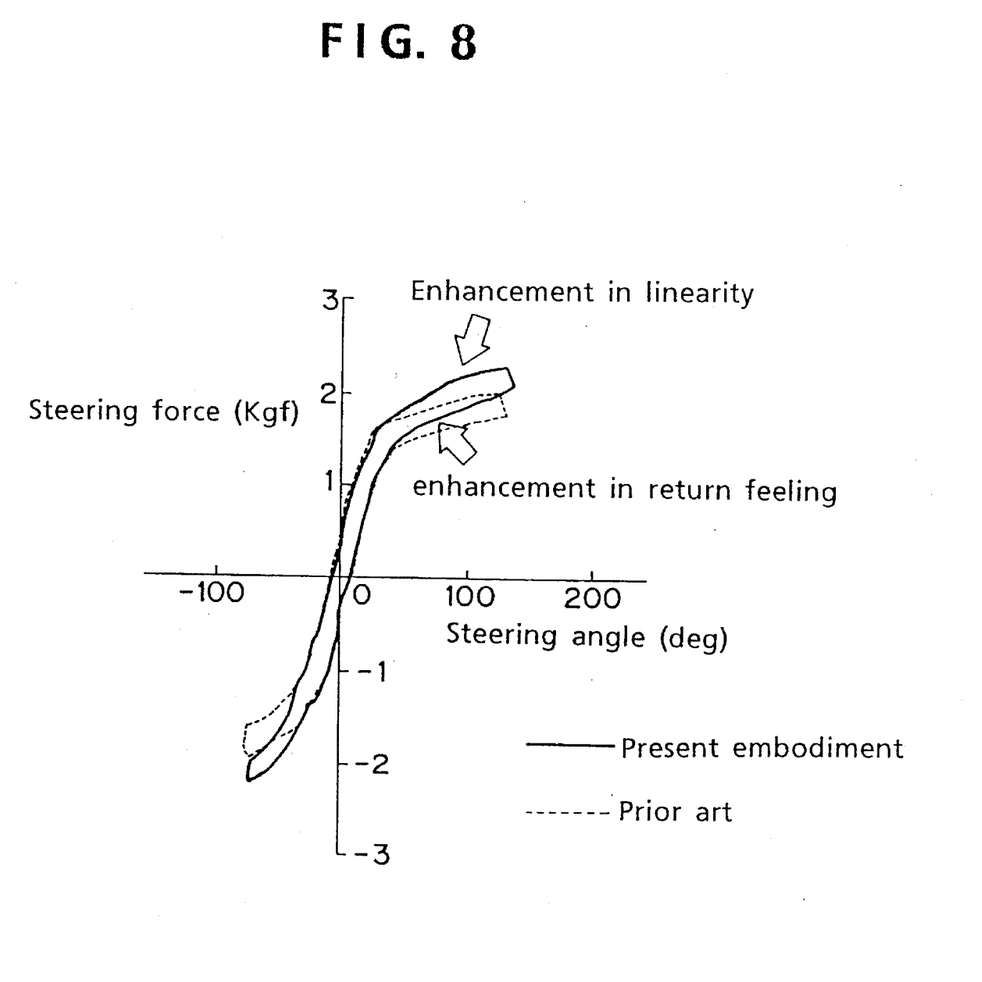
FIG. 8 is a graph showing an effect regarding steering linearity of fuzzy logic control of the present embodiment.

The electronically controlled power steering apparatus of the present embodiment which is applied to the vehicle will be practically evaluated for steering force and return feeling in accordance with tests. The steering linearity characteristic is as shown in the graph shown in FIG. 8. In FIG. 8, the abscissa axis indicates the steering angle, the ordinate axis indicates the steering force, the solid line indicates characteristics of the electronically controlled power steering apparatus (EPS) of the present embodiment, and the broken line indicates characteristics of a conventional electronically controlled power steering apparatus (EPS).

As shown in FIG. 8 by the solid line, the EPS of the present embodiment presents a comparatively linear steering characteristic over a wide range to a range in which the steering angle is large, and accordingly, to a region in which the lateral acceleration GY acting upon the vehicle is high, compared with the conventional electronically controlled power steering apparatus.

Such a linear steering characteristic is obtained in the steering angle region of the membership function regarding the lateral acceleration GY. Further, the graph exhibits a steep gradient in the vicinity of the neutral position of steering compared to the conventional EPS. Accordingly, the steering neutral feeling of the steering wheel is enhanced in the neutral region, and hence this results in an improved return feeling of the steering wheel.

In the above-described embodiment, the control system of the electronically controlled power steering apparatus has been described as a hydraulic type. However, the present embodiment invention is not limited to the embodiment, but alternatively, a similar effect can be obtained when the present invention is applied to an electrically controlled power steering apparatus using a motor. Further, the mechanical system of the electronically controlled power steering apparatus is not limited to the above embodiment, but the present invention can be applied to other types of power steering apparatuses.

In the above-described embodiment, the control unit 51 is provided with the lateral acceleration calculation unit 53, and the lateral acceleration G$_Y$ acting upon the vehicle is calculated in accordance with the vehicle speed V inputted from the vehicle speed sensor 41 and the steering angle ha inputted from the steering angle sensor 52. Alternatively, a lateral acceleration detection sensor may be provided on the vehicle to directly measure the lateral acceleration G$_Y$. Further, evaluation of the membership function regarding the product V.G$_Y$ of the vehicle speed V and the lateral acceleration G$_Y$ and the steering assist amount is divided individually into three stages. However, it may be divided, for example, into five stages. The steering assist amount is determined by the elastic center method. However, this may be determined in other ways, such as by using the maximum average method, the height method (skeleton method), or the area method, for example.

Further, while, in the embodiment described above, the target assist amount is set in accordance with the fuzzy logic rule by the control unit (target assist amount setting device) 51, it may otherwise be set using some other control device.

As described above in detail with reference to the embodiment, since, in the control system and control method for a power steering apparatus of the present invention, the running speed of the vehicle is detected by the vehicle speed detection and the lateral acceleration of the vehicle is detected by the lateral acceleration detection device, and the controller sets the target assist amount using the product of the running speed and the lateral acceleration of the vehicle as input factors, the steering force can be controlled in response to the turning condition to improve steering feeling. This thereby obtains an optimum steering characteristic in accordance with the running and turning condition of the vehicle. Further, since the product of the vehicle speed and the lateral acceleration is used as the input condition, stability of steering operation in a high speed running condition of the vehicle can be improved, thereby simply controlling the steering characteristic in response to the running and turning condition of the vehicle. Since the target steering assist amount is decreased as the product increases, the steering force can be set heavier when the vehicle runs at a high speed or rapidly turns, and the steering force can be appropriately set heavier on a winding road where the vehicle has some speed and lateral acceleration, thereby improving the stability of steering operation.

Further, with the present invention, since the controller sets the target assist amount in according with a fuzzy logic rule using the running speed of the vehicle and the product of the running speed and the lateral acceleration as input variables, fine steering control is possible with a reduced number of rules. Further, a steering feeling of well-balanced stability, which is easy to handle, can be obtained in response to the vehicle speed. Also, the steering linearity is enhanced so that the driver can grasp the running condition of the vehicle, thereby improving the steering characteristic.

Further, with the present invention, the controller sets the target assist amount in accordance with the fuzzy logic rule using a membership function for evaluation of the running speed of the vehicle and another membership function for evaluation of the product of the running speed of the vehicle and the lateral acceleration of the vehicle so that the target assist amount is decreased in response to an increase in the running speed of the vehicle and is decreased in response to an increase in the product of the running speed and the lateral acceleration. Therefore, since the steering assist amount is decreased as the running speed and the lateral acceleration of the vehicle increase, the steering characteristic becomes heavier as the vehicle speed increases to obtain stable steering feeling, and the steering characteristic becomes heavier as turning becomes steeper so that a stable steering feeling according to the turning degree is also maintained.

With the present invention, since the lateral acceleration is determined in accordance with the calculation results of the vehicle speed sensor and the steering angle sensor provided on the vehicle, this thereby reduces the need for an addition of parts for a vehicle which already includes a vehicle speed detection sensor and steering angle detection sensor for some other control and contributes to cost reduction of the power steering apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for a power steering apparatus which controls a steering assist amount of a steering mechanism of a vehicle to coincide with a target steering assist amount, comprising:

vehicle speed detection means for detecting a vehicle speed;

lateral acceleration detection means for determining a lateral acceleration acting upon-the vehicle; and a controller for receiving the detected vehicle speed as a first input factor and setting a first target amount which is decreased according to an increase in the detected vehicle speed, for receiving a product of the detected vehicle speed and the determined lateral acceleration as a second input factor and setting a second target amount which is decreased according to an increase in the product, and for setting the target steering assist amount according to the first target amount and the second target amount.

2. The control system for a power steering apparatus of claim 1, wherein said controller sets the second target amount to a fixed value, irrespective of a change in the received product, when the received product is not less than a predetermined value.

3. The control system for a power steering apparatus of claim 1, wherein said controller sets the target steering assist amount using the first target amount and the second target amount as input variables in accordance with a fuzzy logic rule.

4. The control system for a power steering apparatus of claim 3, wherein said controller sets the target steering assist amount in accordance with a first fuzzy logic rule using a first membership function for evaluation of the speed of the vehicle and a second fuzzy logic rule using a second membership function for evaluation of the product of the speed of the vehicle and the lateral acceleration of the vehicle, so that the first target amount is decreased in response to an increase in the received detected speed of the vehicle in accordance with the first fuzzy logic rule and the second target amount is decreased in response to an increase in the received product of the detected vehicle speed and the determined lateral acceleration in accordance with the second fuzzy logic rule, and the target steering assist amount is set according to the first target amount and the second target amount.

5. The control system for a power steering apparatus of claim 1, wherein said lateral acceleration detection means determines the lateral acceleration from the detected vehicle speed of a vehicle speed sensor and detected steering angle of a steering angle sensor, each of the vehicle speed and steering angle sensors being provided on the vehicle.

6. The control system for a power steering apparatus of claim 1, wherein said lateral acceleration detection means is a lateral acceleration sensor provided on the vehicle for determining the lateral acceleration by directly detecting the lateral acceleration acting upon the vehicle.

7. A control method for controlling a power steering apparatus for controlling a steering assist amount in a steering mechanism of a vehicle to coincide with a target steering assist amount, comprising the steps of:

(a) detecting a vehicle speed;

(b) determining a lateral acceleration acting upon the vehicle;

(c) setting a first target amount, which is decreased according to an increase in the detected vehicle speed, the detected vehicle speed being received as a first input factor;

(d) setting a second target amount, which is decreased according to an increase in a product of the detected vehicle speed and the determined lateral acceleration, the product being received as a second input factor; and (e) setting a target steering assist amount according to the first target amount and the second target amount.

8. The control method for controlling a power steering apparatus of claim 7, wherein step (d) includes the substep of, setting the second target amount to a fixed value irrespective of a change in the received product when the received product is not less than a predetermined value.

9. The control method for controlling a power steering apparatus of claim 7, wherein step (e) includes the substep of, setting the target steering assist amount using the the first target amount and the second target amount as input variables in accordance with a fuzzy logic rule.

10. The control method for controlling a power steering apparatus of claim 9, wherein step (e) further includes the substep of, setting the target steering assist amount in accordance with a first fuzzy logic rule using a first membership function for evaluation of the speed of the vehicle and a second fuzzy logic rule using a second membership function for evaluation of the product of the speed of the vehicle and the lateral acceleration of the vehicle, so that the first target amount is decreased in response to an increase in the received detected speed of the vehicle in accordance with the first fuzzy logic rule and the second target amount is decreased in response to an increase in the received product of the detected speed and the determined lateral acceleration in accordance with the second fuzzy logic rule, the target steering assist amount being set in accordance with the first target amount and the second target amount.

11. The control method for controlling a power steering apparatus of claim 7, wherein step (b) includes the substep of, determining the lateral acceleration in accordance with the detected vehicle speed and a detected steering angle of the steering wheel.

12. The control method for controlling a power steering apparatus of claim 7, wherein step (b) includes the substep of, determining the lateral acceleration by directly detecting the lateral acceleration acting upon the vehicle.

* * * * *